Figure 1:
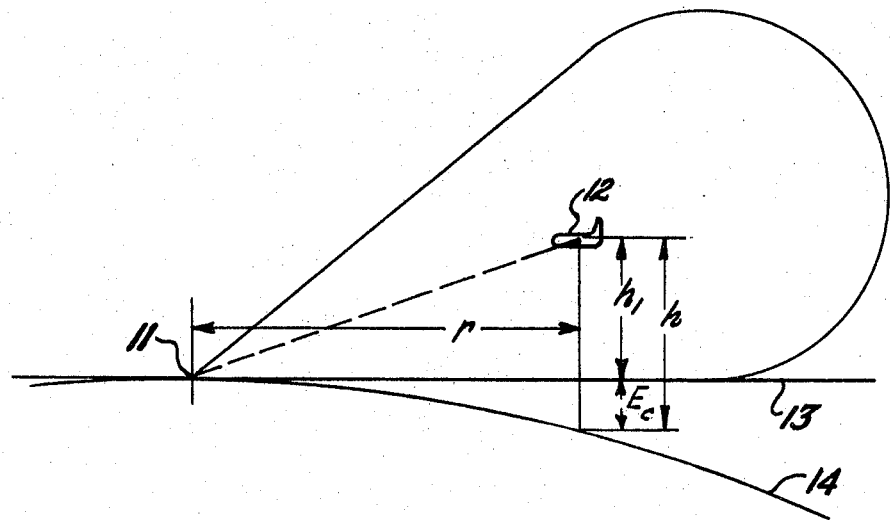

April 11, 1967 G. F. HARPELL 3,313,928
EARTH CURVATURE FUNCTION GENERATOR
Filed Feb. 14, 1962

INVENTOR.
GEORGE F. HARPELL
BY
ATTORNEYS

_United States Patent Office_

3,313,928
Patented Apr. 11, 1967

3,313,928
EARTH CURVATURE FUNCTION GENERATOR
George F. Harpell, Concord, Mass., assignor to the United States of America as represented by the Secretary of the Air Force
Filed Feb. 14, 1962, Ser. No. 173,620
1 Claim. (Cl. 235—197)

The invention described herein may be manufactured and used by or for the U.S. Government for governmental purposes without payment to me of any royalty thereon.

This invention relates to radar indicator systems for determining the height of a radar target, and more particularly to electrical apparatus for obtaining an electric quantity which varies with range in accordance with the deviation of the earth's surface from a plane tangent thereto.

In the use of long range radar systems, the electromagnetic beam propagated thereby is limited to a line of sight characteristic. It can be readily seen, therefore, that a radar beam directly horizontal from the radar transmitting facility will result in a signal which travels along a tangent to the earth's surface as indicated by radar beam 13 of FIGURE 1 below. Radar systems such as V-beam radar that are used for determining the height of a target a considerable distance away must therefore have, as an integral component thereof, means for compensating for the deviation between said tangential signal and the earth's surface at the particular target range.

Conventional radar systems of the type described provide such compensation by either electronic, mechanical, or electro-mechanical devices. The electro-mechanical device presupposes a complete servo loop in which the servo is positioned with an input signal such as a gated range voltage. The balanced potentiometer of such a servo loop is physically connected to another potentiometer having wound upon it the desired non-linear function which represents the curvature of the earth's surface. The output of said last-mentioned potentiometer then provides a voltage that is proportional to the deviation of the earth's surface from any radar beam tangent thereto. Such a system, however, requires an expensive servo system together with two extremely accurate potentiometers. The electronic device currently in use in the prior art for providing this type of non-linear function comprises an electronic function generator having a plurality of diodes which are arranged and biased at the proper points to simulate the curve desired. Such a system also requires a large number of amplifiers and other associated circuit components. This last-mentioned electronic device is also expensive and inaccurate.

Accordingly, it is a principal object of my invention to provide a simplified electrical device for generating a signal responsive to the deviation of the earth's surface from a plane tangent thereto.

It is another object of my invention to provide a function generator of the type described that is inexpensive and easily fabricated from commercially available components.

It is still another object of my invention to provide a function generator adapted to simulate the curvature of the earth's surface that has greater stability and reliability than currently available devices.

Yet another object of my invention is to provide a function generator of the type described that requires a negligible amount of maintenance.

Figure 2:
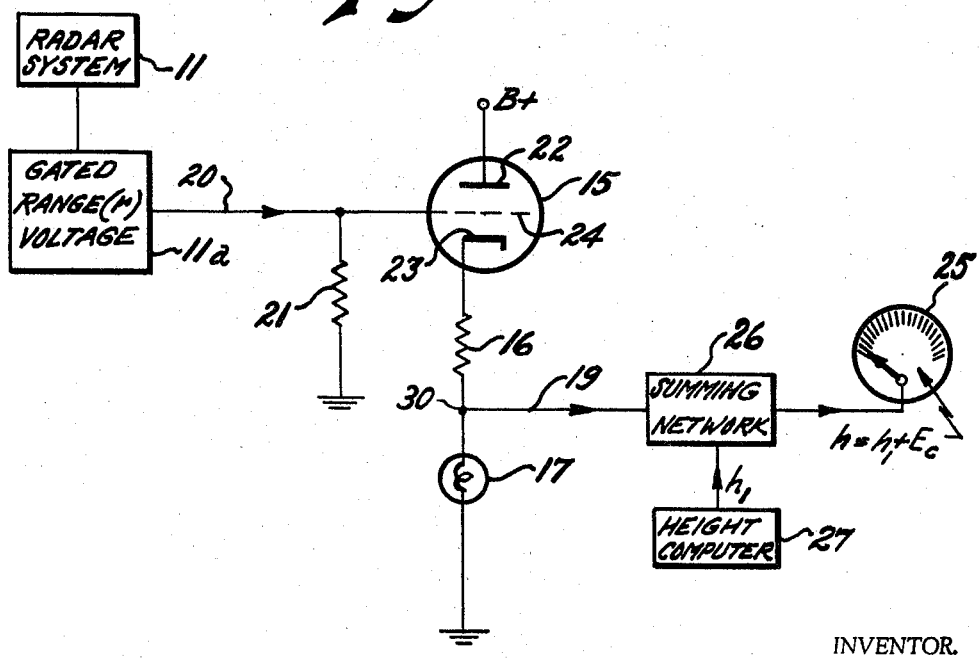

The features of the present invention which are believed to be novel are set forth with particularity in the appended claims. The invention itself, both as to organization and manner of operation, together with further objects and advantages thereof may be best understood by reference to the following description taken in connection with the accompanying drawings in which:

FIG. 1 illustrates the relative geometry involved in the application of a height-finding radar system; and FIG. 2 illustrates a schematic diagram of one presently preferred embodiment of my invention.

Referring now to FIG. 1, there is illustrated the geometry involved in determining the height of a target 12 by the use of radar system 11 located at the point of tangency between the curve 14—representing the curvature of the earth—and the line 13 representing a straight line tangent to the earth's surface at said point 11. Not shown in FIGURE 1 is a gated range responsive voltage generator 11a adapted to receive range-of-target information from system 11. Most radar systems used in determining the height of a target utilize the V-beam technique whereby two fan-like radar beams are used to scan a given area. Such beams are propagated at an appreciable angle to each other so that they form a V configuration. By determining the length of time between returns from each of the radar beams a complete triangle may be constructed such that the bottom of the radar beams where they intersect forms the vertex of the triangle and the height of the triangle is determined trigonometrically. It can be readily seen by reference to FIG. 1 that the greater the distance or range from the radar station, the greater will be the deviation between the base or vertex line of the two radar beams and the earth's surface. This is designated as $E_c$ in said FIGURE 1. The actual height of the target then is obtained by adding the value $E_c$ to the computed value $h_1$.

Referring now to FIG. 2, there is illustrated a schematic diagram of a device adapted to automatically compute and display the above value $E_c$ for any given range. In essence, the device comprises triode 15 which may be any electron discharge device adaptable for use as a cathode follower tube arranged in series relationship with resistance element 16 and filamentary resistance device 17. A positive B+ voltage is applied to the anode 22 of said triode 15 and cathode 23 is grounded through the aforementioned resistances and filamentary resistance devices. The gated range voltage generated in unit 11a is applied through lead 20 to grid 24. One megohm resistance 21 ties grid 24 to ground providing a grid bias of 0 volts when no input signal is present, thereby preventing tube runaway. An output of the device is obtained through lead 19 at the junction 30 of resistor 16 and filamentary resistive device 17. Lead 19 supplies its pick-off signal, $E_c$, to conventional summing network 26 which simultaneously receives a signal representative of $h_1$ from height computer 27. The output signal from summing network 26 is fed to voltmeter 25, calibrated to display the $E_c$ plus $h_1$ value. It is a specific property of resistor 16 that no change in resistance value will occur due to heating over the operating range of the device. It is a specific characteristic of filamentary resistance device 17 that the resistance value thereof will change when heated due to current flowing therethrough. Filamentary resistive device 17 may be any resistance element having the above-described temperature-resistance characteristics.

It is the particular combination of the resistance 16 and filamentary resistance device 17 in the above-described circuit arrangement wherein there is provided the unique ratio of resistance change of filamentary resistive device 17 to resistance 16 in response to the input range voltage that generates the desired output signal. The values chosen for the elements 16 and 17, and the ratio therebetween, will of course determine the action of the pointer in relation to the scale of the indicating device 25; in other words the indicating device 25 will be calibrated to respond properly to reflect changes in the voltage generated in element 11a, in accordance with the chosen relative value relationships between elements 16 and 17 and the temperature-resistance characteristics of the chosen element 17.

While a particular embodiment of the present invention has been shown and described, it will be obvious to those skilled in the art that changes and modifications may be made without departing from this invention in its broader aspects and therefore the aim in the appended claim is to cover all such changes and modifications that fall within the true spirit and scope of my invention.

I claim:

The method of developing an output signal proportional to the height of a tangent above the surface of the earth at any given range from the point of tangency comprising the steps of applying to the grid of an electronic discharge tube an input voltage responsive to said range, providing a positive voltage to the anode of said tube, inserting a first resistance element, in the cathode follower circuit of said tube, said first resistance element having a constant resistance value over the operating range of said tube, inserting a second resistance element in said cathode follower circuit, said second resistance element being connected between said first resistance element and ground and having a variable resistance value over the operating range of said tube, said resistance value being responsive to said input voltage, and obtaining an output voltage from the junction of said first and second resistance elements.

References Cited by the Examiner

UNITED STATES PATENTS

| | | | |
|---|---|---|---|
| 2,444,770 | 7/1948 | Fyler | 235—191 |
| 2,444,771 | 7/1948 | Fyler | 235—191 |
| 2,718,594 | 9/1955 | White | 328—182 |
| 2,964,713 | 12/1960 | Shepard | 330—143 X |

MALCOLM A. MORRISON, *Primary Examiner.*

CHESTER L. JUSTUS, P. M. HINDERSTEIN, I. KESCHNER, *Assistant Examiners.*